(12) United States Patent
Lynch et al.

(10) Patent No.: US 7,845,666 B2
(45) Date of Patent: Dec. 7, 2010

(54) SWINGING HUB FOR ADJUSTING WHEEL CAMBER

(75) Inventors: Eric S. Lynch, Crawfordsville, IN (US); Anthony P. Beach, Crawfordsville, IN (US)

(73) Assignee: Purdue Research Foundation, West Lafayette, IN (US)

( * ) Notice: Subject to any disclaimer, the term of this patent is extended or adjusted under 35 U.S.C. 154(b) by 203 days.

(21) Appl. No.: 11/714,571

(22) Filed: Mar. 6, 2007

(65) Prior Publication Data

US 2007/0205576 A1 Sep. 6, 2007

Related U.S. Application Data

(60) Provisional application No. 60/779,617, filed on Mar. 6, 2006.

(51) Int. Cl.
*B62K 5/02* (2006.01)
(52) U.S. Cl. .................. 280/282; 280/86.751
(58) Field of Classification Search ............. 280/86.75, 280/86.751, 86.757, 5.521, 124.103, 282, 280/267, 250.1; 180/907, 65.1
See application file for complete search history.

(56) References Cited

U.S. PATENT DOCUMENTS

| | | | |
|---|---|---|---|
| 2,391,982 A * | 1/1946 | Kutil | ........................ 280/293 |
| 3,001,601 A | 9/1961 | Aghnides | |
| 3,014,547 A | 12/1961 | Van Der Lely | |
| 3,765,466 A | 10/1973 | Tsuruta | |
| 3,799,565 A | 3/1974 | Burtis et al. | |
| 3,937,486 A | 2/1976 | Weiters | |
| 3,958,814 A * | 5/1976 | Smith | ........................ 280/269 |
| 4,497,502 A | 2/1985 | Forbes et al. | |
| 4,526,392 A | 7/1985 | Berkstresser | |
| 4,541,501 A | 9/1985 | Kawaski | |
| 4,546,997 A * | 10/1985 | Smyers | ........................ 280/5.509 |
| 4,634,137 A | 1/1987 | Cocksedge | |
| 4,789,173 A | 12/1988 | Lofgren et al. | |
| 4,887,829 A | 12/1989 | Prince | |
| 4,903,857 A | 2/1990 | Klopfenstein | |
| 4,909,537 A * | 3/1990 | Tratner | ........................ 280/278 |
| 4,921,263 A | 5/1990 | Patin | |

(Continued)

FOREIGN PATENT DOCUMENTS

DE 4 136 456 * 1/1993

(Continued)

OTHER PUBLICATIONS

Access Center Spoke Shop, Action Top End Eliminator™, [online], © 2000, [retrieved on Nov. 30, 2005]. Retrieved from the Internet: <http://www.spokeshopsd.org/top_end_elminator_racing_chair.htm> (1pg).

(Continued)

*Primary Examiner*—Paul N. Dickson
*Assistant Examiner*—George D. Spisich
(74) *Attorney, Agent, or Firm*—Ice Miller LLP

(57) ABSTRACT

A swinging hub is disclosed for adjusting the camber of at least one wheel mounted for rotation about one of a two oppositely extending axles via a camber adjustment mechanism including an actuator coupled to the at least one axle.

18 Claims, 12 Drawing Sheets

Fig. 1

U.S. PATENT DOCUMENTS

| | | | |
|---|---|---|---|
| 5,240,267 A | | 8/1993 | Owsen |
| 5,480,172 A | | 1/1996 | James |
| D369,330 S | | 4/1996 | Hill et al. |
| 5,611,555 A | | 3/1997 | Vidal |
| 5,662,345 A | * | 9/1997 | Kiewit ............... 280/250.1 |
| 5,762,351 A | | 6/1998 | SooHoo |
| 5,769,441 A | | 6/1998 | Namngani |
| D430,070 S | | 8/2000 | Keiuk |
| 6,170,838 B1 | * | 1/2001 | Laurent et al. ........ 280/5.508 |
| 6,220,612 B1 | | 4/2001 | Beleski, Jr. |
| 6,308,804 B1 | * | 10/2001 | Roberts ................. 188/2 F |
| 6,367,824 B1 | | 4/2002 | Hayashi |
| 6,402,174 B1 | | 6/2002 | Maurer |
| 6,412,804 B1 | * | 7/2002 | Dignat ................. 280/283 |
| 6,637,758 B2 | * | 10/2003 | Woo .................. 280/5.521 |
| 6,817,617 B2 | | 11/2004 | Hayashi |
| D503,662 S | | 4/2005 | Tiyawatchalapong |
| 7,131,650 B2 | * | 11/2006 | Melcher ............... 280/5.52 |
| 7,195,249 B2 | * | 3/2007 | Kim ................... 280/5.51 |
| 7,481,443 B2 | * | 1/2009 | Shim et al. ............. 280/282 |
| 2001/0028154 A1 | * | 10/2001 | Sebe ................. 280/86.757 |
| 2002/0093152 A1 | * | 7/2002 | Laurent et al. ......... 280/5.521 |
| 2002/0163163 A1 | | 11/2002 | Shapiro |
| 2003/0034635 A1 | * | 2/2003 | Ludovici ............... 280/647 |
| 2006/0022422 A1 | | 2/2006 | Tasma |
| 2006/0220335 A1 | * | 10/2006 | Damm ............... 280/86.757 |
| 2007/0007739 A1 | * | 1/2007 | Bailey et al. ........... 280/47.38 |

FOREIGN PATENT DOCUMENTS

| | | | |
|---|---|---|---|
| EP | 0 824 907 | * | 2/1998 |
| JP | 01182105 A | | 7/1989 |
| WO | WO 98/53786 | * | 12/1998 |

OTHER PUBLICATIONS

Invacar® Top End R EliminatorTM OSR Racing Chair, [online], © 2005, [retrieved on Dec. 1, 2005]. Retrived from the Internet: http://www.invacare.com/product_files/G2001_192B.pdf (2 pgs).

Douglas, Andrew B., Hellbent ST20, "Sleek US trike offering," [online], [retrieved on May 4, 2006]. Retrieved from the Internet: http://www.bentrideronline.com/2004Feb/hellbentst20.htm (7 pages).

* cited by examiner

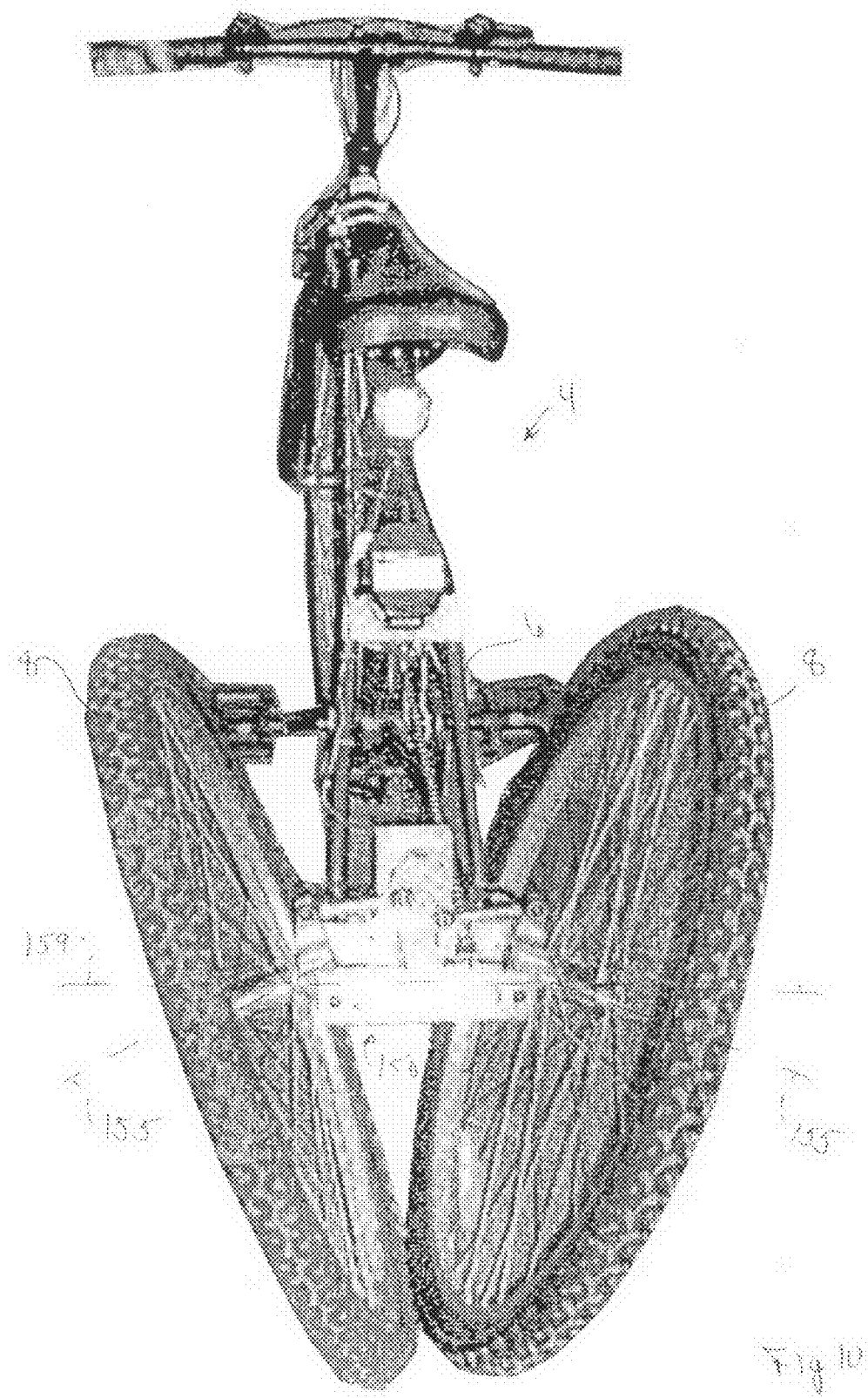

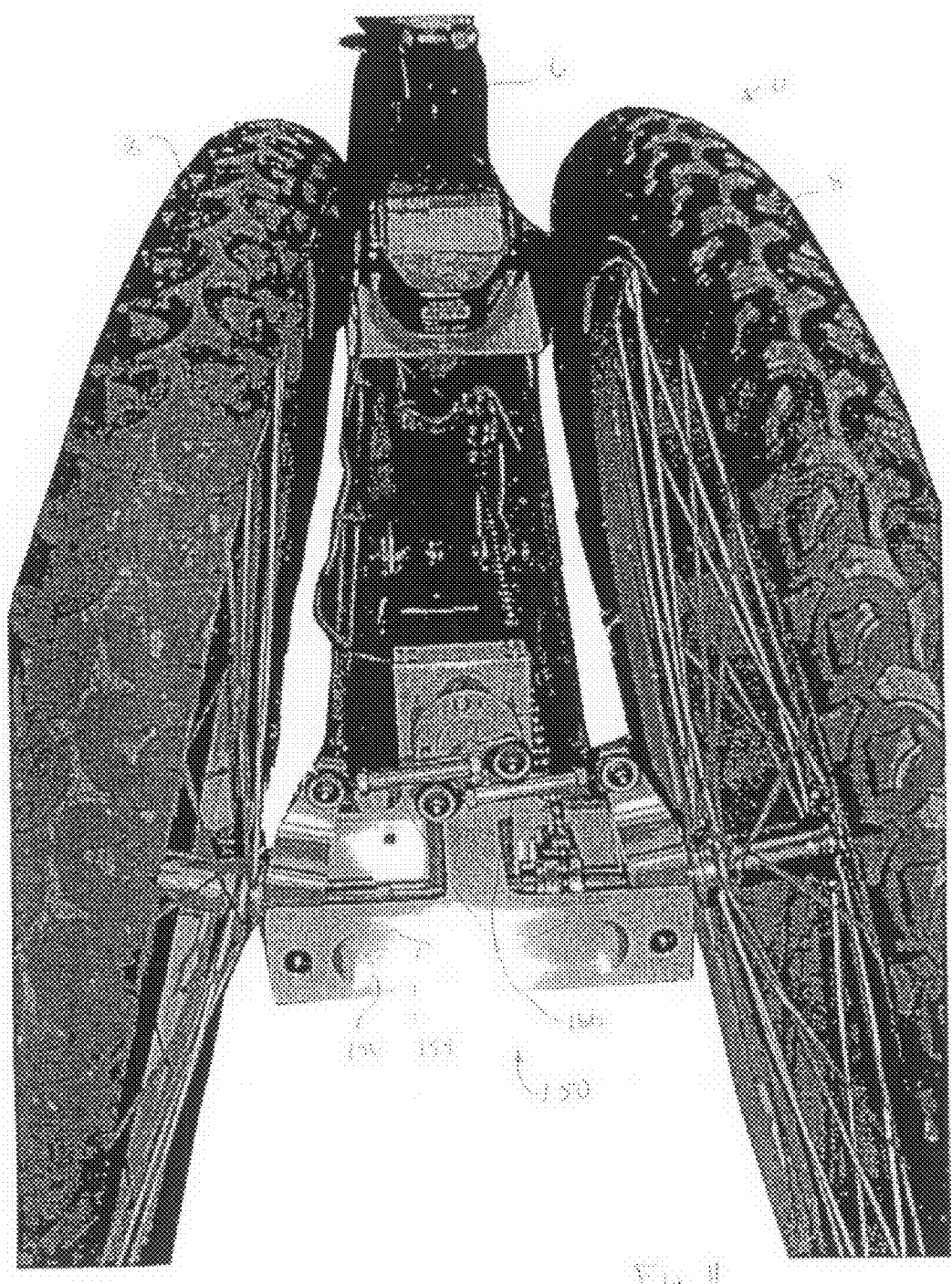

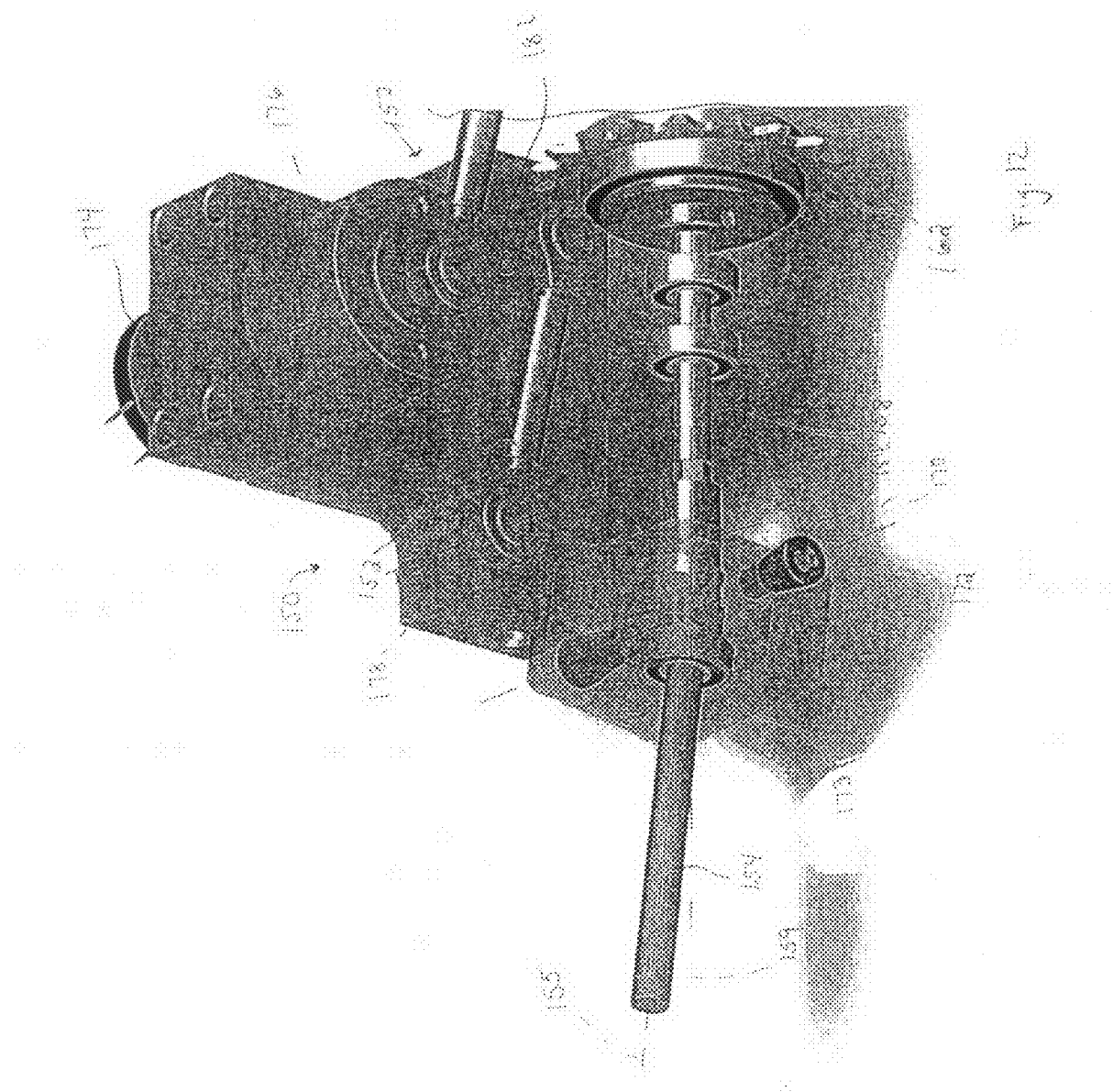

US 7,845,666 B2

SWINGING HUB FOR ADJUSTING WHEEL CAMBER

RELATED APPLICATIONS

This application claims priority to Provisional Application Ser. No. 60/779,617, filed Mar. 6, 2006, the disclosure of which is hereby incorporated herein by reference. This application is related to U.S. patent application Ser. No. 11/417,684, entitled Vehicle with Variable Wheel Camber filed on May 4, 2006, owned by the common assignee Purdue Research Foundation, the disclosure of which is hereby incorporated by reference.

BACKGROUND AND SUMMARY

The present disclosure relates to bicycles and other human-powered and motorized wheeled vehicles, and more particularly to devices for helping people maintain stability on a bicycle or other wheeled vehicle which requires balance for stable operation.

While the disclosed swinging hub for adjusting wheel camber is not limited to learning to ride a bicycle, an understanding of the principles of operation of the disclosed swinging hub may be gleaned from describing the process of learning to ride a bicycle. The traditional process of learning to ride a bicycle is frightening and can be painful, and the process has not changed over the years. Typically a child gets assistance from a parent who pushes the child on a bike, runs alongside and then lets go, hoping that the child will gain balance before falling over. The learning curve during this process is very steep.

Conventional tricycles are well known for use by children not ready to begin learning to ride a bike, and training wheels are well known accessories for children's bicycles. However, there remains a need for devices to make the process of learning to ride a bike safer and enjoyable, and to make the process part of the goal itself, with the result of a more positive experience for parent and child alike.

One difficulty arising with bicycles and other two-wheeled vehicles is that at rest or at slow speeds, the ability to maintain the vehicle in an upright manner relies much more heavily on the ability of the rider to balance themselves and the vehicle. As speed increases the gyroscopic effects generated by the spinning wheels helps to maintain the vehicle upright. Thus, all riders of bicycles and other vehicles not having a broad lateral wheelbase must exert additional effort to maintain the vehicle in an upright position when at rest or at a slow speed. All riders of such vehicles might appreciate a mechanism that allows such vehicle to have a broader lateral wheel base when the vehicle is at rest or moving at slow speed which lateral wheelbase may be narrowed as the speed of the vehicle increases.

The disclosed swinging hub for adjusting wheel camber has various aspects but is particularly well suited to helping children learn how to ride a bike on their own and for other situations in which a rider of a vehicle desires the inherent stability of a vehicle to be changed under differing circumstances. Unlike traditional training wheels, that simply prevent the bike from tipping, the disclosed swinging hub for adjusting wheel camber when utilized with a wheeled vehicle allows children to learn how to balance themselves gradually, and thereby allows them to learn at their own pace. The disclosed swinging hub for adjusting wheel camber also allows all riders of vehicles equipped with such hub to exert less effort to maintain the stability of the vehicle when it is at rest or at slow speed.

More particularly, the disclosed swinging hub for adjusting wheel camber provides a swinging hub capable of providing adjustable wheel camber for a vehicle. According to one aspect of the disclosure the hub has a body with left and right axles extending laterally therefrom, at least one axle being pivotally mounted, and includes a camber control mechanism coupled at least to the one axle and adapted to adjust the angle thereof with respect to the other axle. The camber control mechanism includes a linkage for engaging the at least one axle and further includes an actuator mounted on the hub body for selectively driving the axle up and down to adjust the wheel camber.

According to another aspect of the disclosure a hub for providing adjustable wheel camber on a bicycle, comprises a hub body, left and right axles and a camber control mechanism. The left and right axles extend laterally from said hub body and are each adapted to support a wheel with at least one of said axles mounted so as to pivot vertically. The camber control mechanism is coupled to said at least one axle and adapted to adjust the angle thereof with respect to the other axle. The hub is adapted for removable attachment to a pair of dropouts on a bicycle frame.

According to yet another aspect of the disclosure a human powerable wheeled vehicle with a camber adjustment mechanism comprises a frame, at least one wheel rotatably mounted on one end portion of said frame, a hub mounted on a second end portion of said frame, and a camber control mechanism. The hub has first and second axles extending laterally therefrom with at least one of said axles being vertically pivotally mounted; a wheel mounted on each of said axles; and a camber control mechanism. The camber control mechanism adjusts the angle of said pivotally mounted axle and thereby adjusts the camber of the wheel mounted thereon. The camber control mechanism includes a linkage for engaging said pivotally mounted axle and further includes an actuator mounted on said hub body for selectively driving said linkage up and down to adjust the wheel camber.

The objects and advantages of the disclosed swinging hub will be more apparent upon reading the following detailed description in conjunction with the accompanying drawings.

BRIEF DESCRIPTION OF THE DRAWINGS

FIGS. 9 and 10 are comparison rear views of the same bicycle, with the rear wheels tilted inwardly (negative camber) in FIG. 9 and outwardly (positive camber) in FIG. 10.

FIG. 11 is a close-up view of the swinging hub on the same bicycle, with the wheel axles pivoted upwardly and the rear wheels correspondingly tilted inwardly.

FIG. 12 is a close up perspective view of a portion of the swinging hub of FIG. 5 with the mounting frame removed and the collar 72 shown as transparent to reveal inner components.

DETAILED DESCRIPTION

Figure 1:
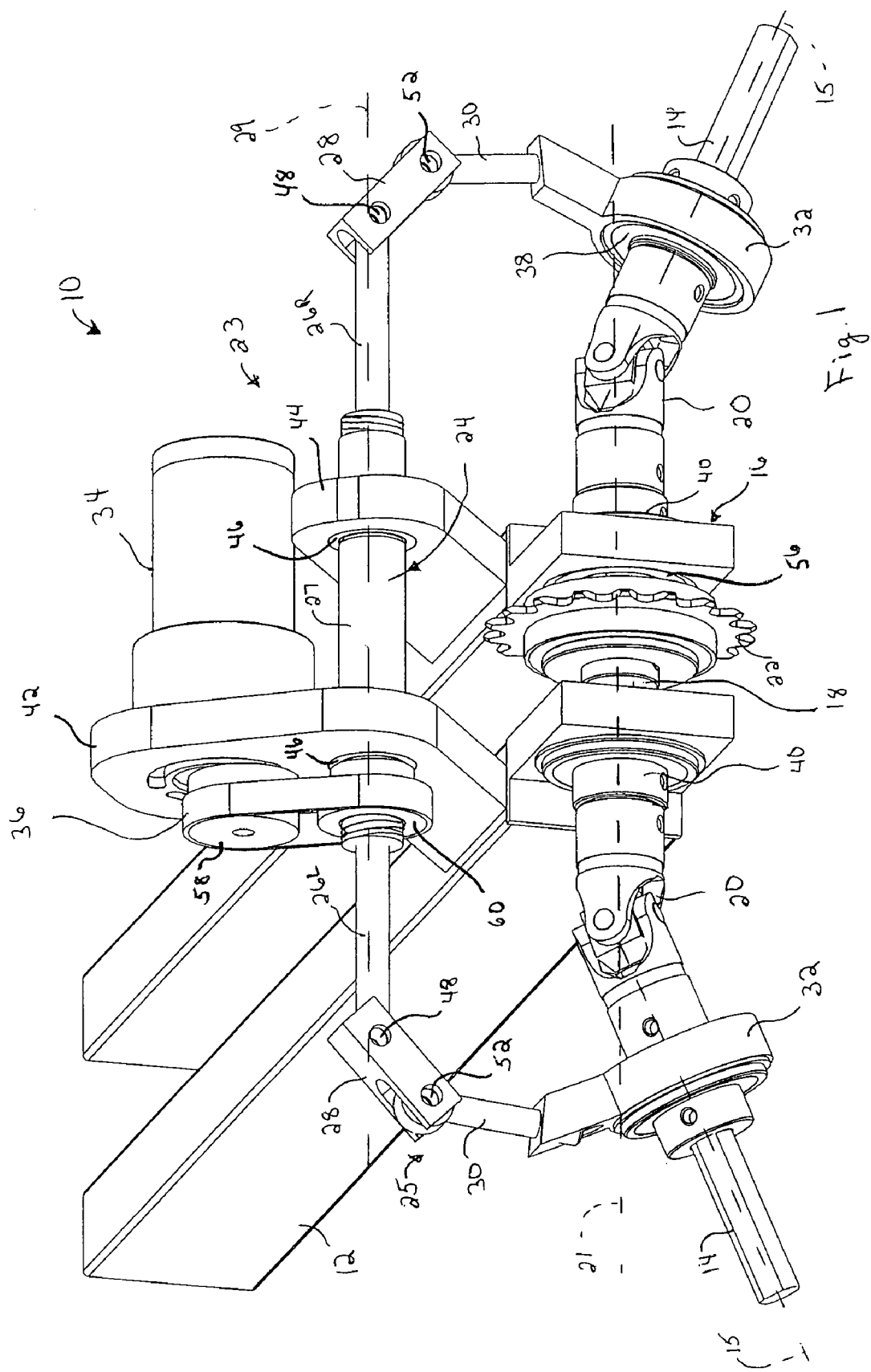
FIG. 1 is an upper left, rear perspective view of one embodiment of a swinging hub for adjusting wheel camber, with the wheel axles pivoted downwardly to tilt the wheels outwardly (positive camber).
Figure 2:
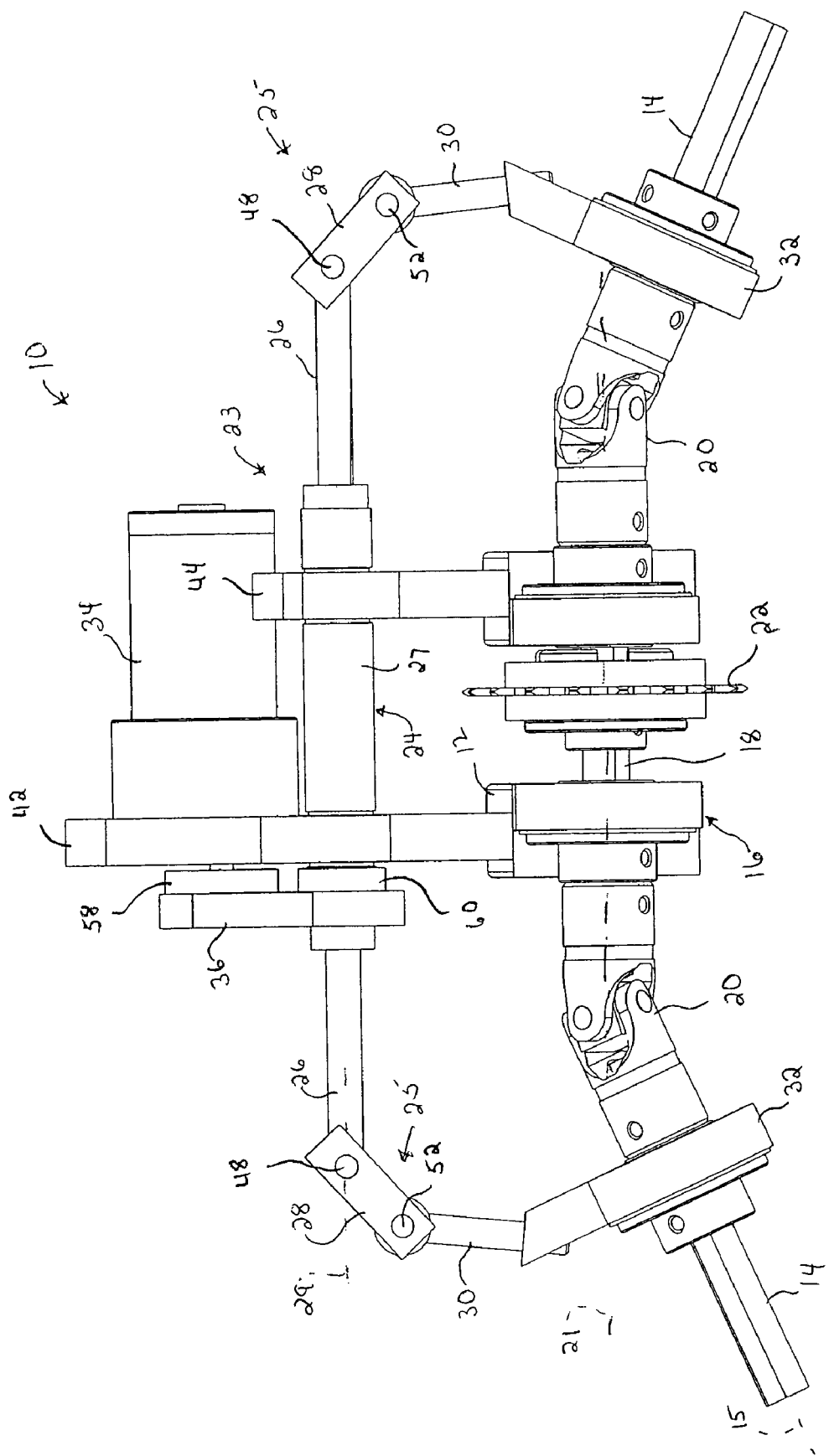
FIG. 2 is a rear view of the swinging hub of FIG. 1, in the same positive camber mode of operation.
Figure 3:
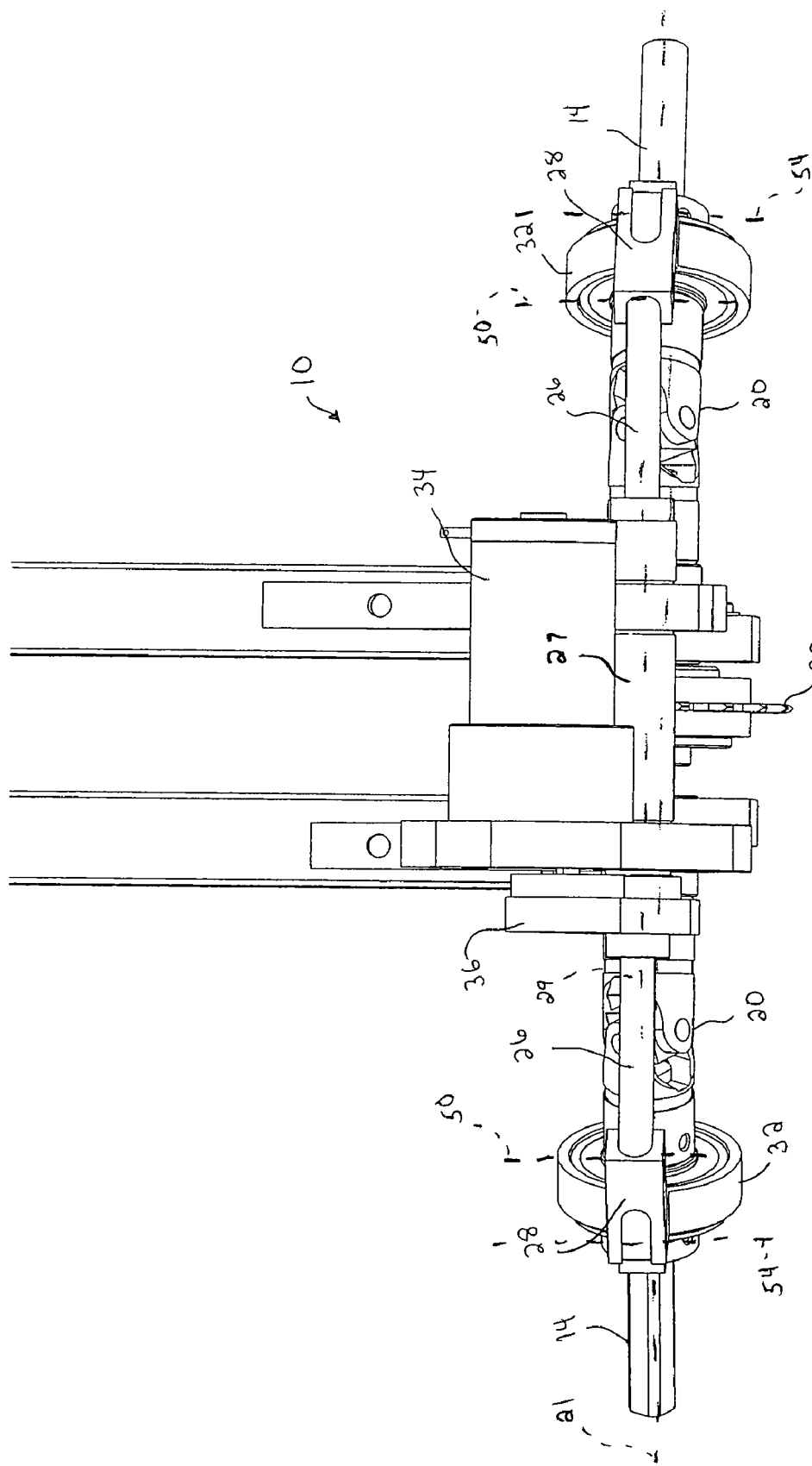
FIG. 3 is a top view of the swinging hub of FIG. 1, in the same positive camber mode of operation.
Figure 4:
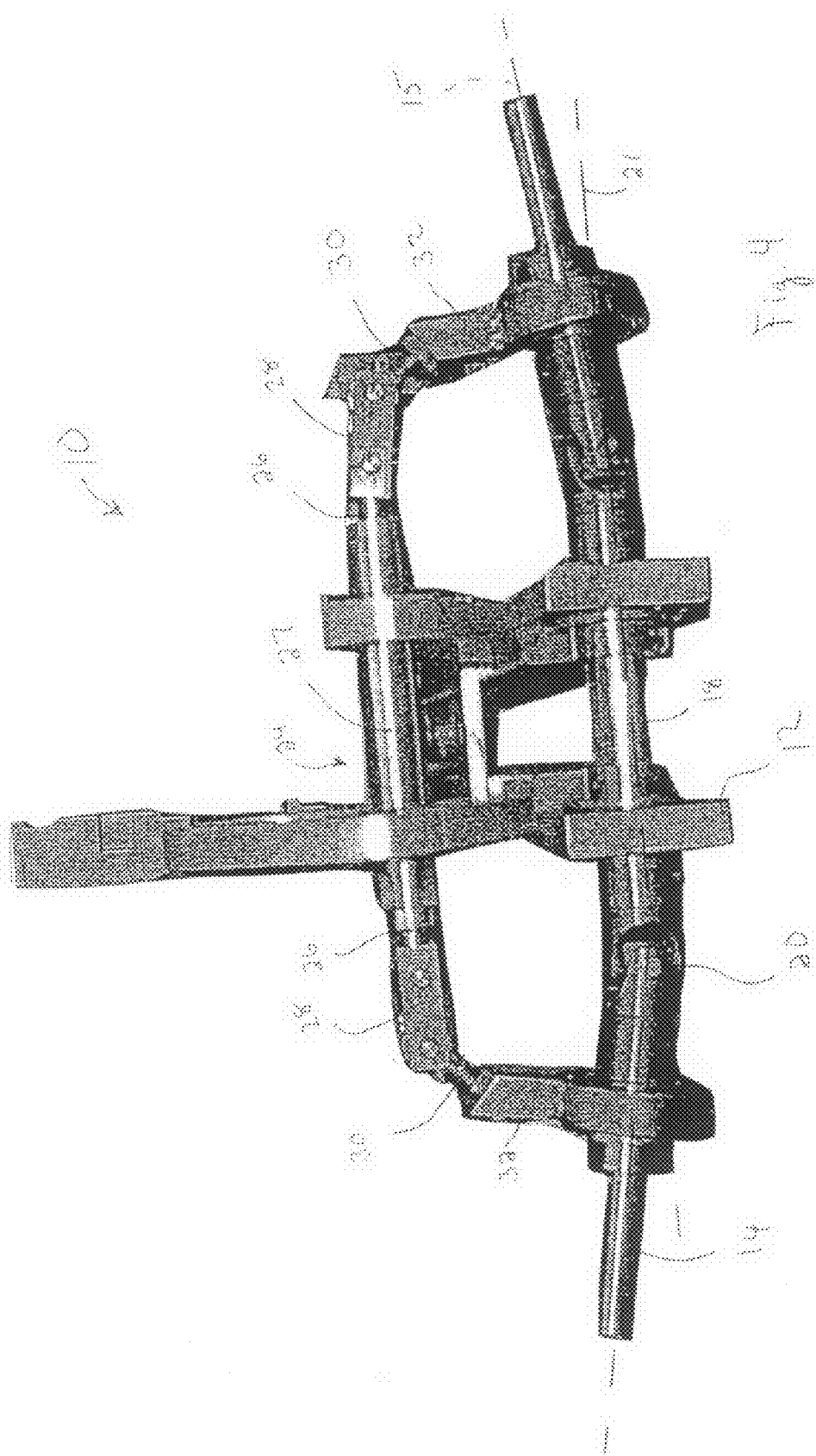
FIG. 4 is a rear view of a swinging hub similar to that of FIG. 1 but with the motor not installed, with the wheel axles pivoted upwardly to tilt the wheels inwardly (negative camber).

For the purpose of promoting an understanding of the principles of the disclosure, reference will now be made to the embodiments illustrated in the drawings and specific language will be used to describe the same. It will nevertheless be understood that no limitation of the scope of the disclosure is thereby intended, such alterations and further modifications in the illustrated devices and such further applications of the principles of the disclosure as illustrated therein being contemplated as would normally occur to one skilled in the art to which the invention relates.

FIGS. 1-4 illustrate one embodiment of a swinging hub 10 for adjusting wheel camber. Hub 10 includes a frame section 12 for mounting to a frame 6 of a wheeled vehicle 4, two axles 14 which extend laterally from a hub body or rear bearing carriers 16, a main shaft 18 rotatably mounted in the hub body 16, universal joints 20 coupling the main shaft 18 to the two axles 14 and a camber control mechanism 23. The universal joints or U-joints 20 are coupled to opposite ends of the main shaft 18 and facilitate positioning of axles 14 at desired angles relative to the axis 21 of main shaft 18.

In one embodiment, hub 10 is designed for mounting on the rear end of the frame of a bicycle 4 (FIGS. 8-11), e.g., on the chain stays thereof, and includes a drive sprocket 22 mounted on shaft 18 for connection to a bicycle chain in a conventional manner. When the chain drives the sprocket 22, the main shaft is induced to rotate about its axis which induces the axles 14 coupled through the U-joints 20 to rotate about their respective axes 15. It is within the scope of the disclosure for rotation of the main shaft 18 to be induced through other mechanism.

The camber control mechanism 23 of hub 10 includes a linear actuator 24, a motor 34, a coupler 36 extending between the motor 34 and the linear actuator 24 and linkages 25 coupling each shaft 14 to the linear actuator 24. The illustrated linear actuator 24 includes a control rod 26 extending from each end of an actuator body 27. The linear actuator 24 is mounted directly above main shaft 18 and U-joints 20 so that the axis 29 of the actuator body is substantially parallel to the axis 21 of the main shaft 18. The exterior end of each control rod 26 is connected its corresponding axle 14 through a linkage 25 comprising a link 28, connecting rod 30 and a collar 32 for control of the angular orientation of the axis 15 of the axle 14 relative to the axis 21 of the main shaft 18. As shown, for example, in FIG. 1, each collar or actuation arm 32 includes a bearing 38 to allow axle 14 to rotate therein about the axis 15 of the axle 14.

As shown, for example, in FIGS. 1-4, the exterior end of each control rod 26 is pivotally mounted to one end of link 28 which is in turn pivotally mounted at the opposite end to the proximal end of a control rod 30. A proximal pivot pin 48 having an axis 50 extends through the rod 26 and the proximal end of the link 28 to allow pivotal movement of the link relative to the rod 26 about axis 50. Illustratively, axis 50 is substantially perpendicular to and interests axis 29 of the actuator body 27 and also substantially perpendicular to the axis 21 of main shaft 18. A distal pivot pin 52 having an axis 54 extends through the proximal end of connecting rod 30 and the distal end of the link 28 to allow pivotal movement of the link relative to connecting rod 30 about axis 54. Illustratively, axis 54 is substantially perpendicular to both axis 29 of the actuator body 27 and axis 21 of main shaft 18. A motor/actuator mounting flange 42 mounts the motor 34 and cooperates with an actuator mounting flange 44 to mount the actuator body 27 for rotation about its axis 29 when driven by motor 34 via coupler 36. Bearings 46 received in the motor/actuator mounting/flange 42 and the actuator mounting flange 44 facilitate rotation of the actuator body 27 about its longitudinal axis 29 when driven by motor 34.

In the illustrated embodiment, the distal end of each connecting rod 30 includes a ball joint rod end that is received in an articulation cavity formed in the actuation arm 32. The portion of each connecting rod 30 adjacent the ball joint end extends through a slot in the proximal end of the actuation arm 32 that communicates with the articulation cavity to allow constrained movement of the actuation arm 32 relative to the connecting rod 30.

In the embodiment of the hub 10 shown in FIGS. 1-4, the frame section 12 is shown as including two parallel rectangular tubes each having a bearing carrier 16 extending longitudinally from an end thereof for receiving bearings 56 within which the main shaft 18 is mounted for rotation about its axis 21. Lock collars 40 coupled to the shaft 18 prohibit longitudinal movement of the shaft 18 along its axis 21 relative to the bearing retainers 16.

In the illustrated embodiment, the actuator 24 is a dual-action lead-screw actuator with threaded rods 26 extending from opposite ends of an internally threaded actuator body 27 mounted to rotate about is axis 29. Illustratively one rod 26R is left hand threaded while the other rod 26L is right hand threaded so that both rods 26 simultaneously extended or simultaneously retracted, as desired, upon rotation of the actuator body 27. Rotation of the actuator body 27 is induced and controlled by electric motor 34 which is coupled through a drive belt 36 extending around a drive pulley 58 mounted to the shaft of the motor 34 and a driven pulley 60 mounted to the actuator body 27. Thus, motor 34 rotates the body 27 of actuator 24 relative to the threaded rods 26 which based on the direction of rotation are induced to extend from or retract into the actuator body 27.

The control mechanism 23 as shown and described limits the axles 14 to vertical pivoting, and provides a range of axle angles including angles above and below horizontal. It will be understood by those skilled in the art that camber angle is the angle of the plane of the wheel 8 with respect to vertical. Inward tilt of the top of the wheel 8, that is, toward the centerline of the vehicle, is called negative camber, while outward tilt is called positive camber. Thus, with an axle 14 at an angle above horizontal, a wheel 8 mounted thereon is tilted inwardly and thus has negative camber. Conversely, an angle below horizontal corresponds to outward tilt and thus positive camber.

Separate single-action actuators are also contemplated, as is a single actuator in applications where one adjustable axle is considered adequate for the intended purpose. Different types of actuators are also contemplated, including hydraulic and pneumatic actuators, solenoids other electromagnetic linear actuators and shape-memory alloys. However, the disclosed dual action lead-screw actuator 24 is presently preferred for producing simultaneous camber adjustment in the same direction for both wheels 8.

The hub body may be formed as an integral part of the frame of the bicycle or other vehicle, e.g., welded to the ends of the chain stays of a bicycle. However, the hub 10, as shown, for example, in FIGS. 1-4 may be a separate component provided with mounting studs or holes for removable attachment to the dropouts provided for wheel attachment, e.g., the rear dropouts at the junctions of the chain stays and seat stays of a conventional bicycle frame. It should also be understood that frame section 12 of FIG. 1 may be a bicycle fork and that a hub 10 may be removably attached to the dropouts therein, or may be permanently attached to the end of a special fork intended for training purposes.

Referring now to FIGS. 5-7 and 12, one retrofit embodiment of a swinging hub for adjusting wheel camber 150 includes two axles 154 which extend laterally from an H-shaped mounting plate or hub body 156 and connect to a main shaft 158 by universal joints 160. Each axle has an axis 155 and main shaft 158 has an axis 159. Axles 158 and main shaft 158 are mounted to spin about their respective axes 155, 159. Hub 150 has a drive sprocket 162 mounted on shaft 158 for connection to a bicycle chain in a conventional manner for driving the main shaft 158 to rotate about its axis 159 inducing rotation via the U-joints 160 of each axle 154 about its axis 155. Hub 150 also includes a camber control mechanism 152 that adjusts the angle of the axis 155 of each axle 154 in a vertical plane relative to the axis 159 of the main shaft 158.

The camber control mechanism 152 includes a motor-driven rotary actuator 164 having a pair of tie rods 166 connected thereto through a dual crank arm 168, each tie rod 166 being connected to a collar 172 around an associated axle 154 for control of the angular orientation thereof. Each collar 172 is coupled by appropriate fasteners extending through mounting bosses 184 to the H-shaped mounting plate 156 to pivot about a pivot axis 170. The pivot axis 170 is substantially perpendicular to the axis 159 of the main shaft and intersects with this axis 159 at approximately the universal pivot point of the U-joint 160 to allow each collar to pivot about the pivot axis 170 relative to the H-shaped hub body 156. A cavity is formed in the collar 172 sized to receive a U-joint 160 and a bearing 173, as shown, for example, in FIG. 12. Each axle 154 is received in its associate bearing 173 which constrains the axle 154 to rotate about its axis 155 regardless of the angular orientation of the collar 172 with respect to the hub body 156 and the angle of the axis 155 of the axle 154 relative to the axis 159 of the main shaft 158.

The actuator 164 turns the crank arm 168 one way or the other as desired and thereby causes the tie rods 166 to simultaneously move the collars 172, under control of an electric motor 174. One end of each tie rod 166 is mounted with an appropriate fastener for pivotal movement about an axis 176 relative to the crank arm 168. The other end of each tie rod 166 is mounted with an appropriate fastener to an upper end of its associate collar 172 to allow the collar to pivot about an axis 178 relative to the end of the tie rod 166 as the collar 172 concurrently pivots about the axis 170 relative to the mounting plate 156. Each pivot axis 170, 176 and 178 is substantially parallel to the other and substantially perpendicular to the axes 155, 159 of the axles 154 and the main shaft 158, respectively. Pivot axes 170 of each collar 172 is fixed in space relative to the H-shaped hub body 156.

The motor 174 is configured to rotate crank arm 168 through approximately ninety degrees (forty-five degrees to opposite sides of vertical) relative to the axis 180 of the drive shaft 182 of the motor which is substantially parallel to axes 170, 176 and 178. Reciprocal rotation of the crank arm 168 induces each collar 172 to pivot about its respective pivot axis 170 to induce the axis 155 of its respective axle 154 to pivot in a vertical plane relative to the axis of the main shaft 158 between upper and lower limits which adjust the camber of wheels 8 mounted to each axle.

Figure 5:
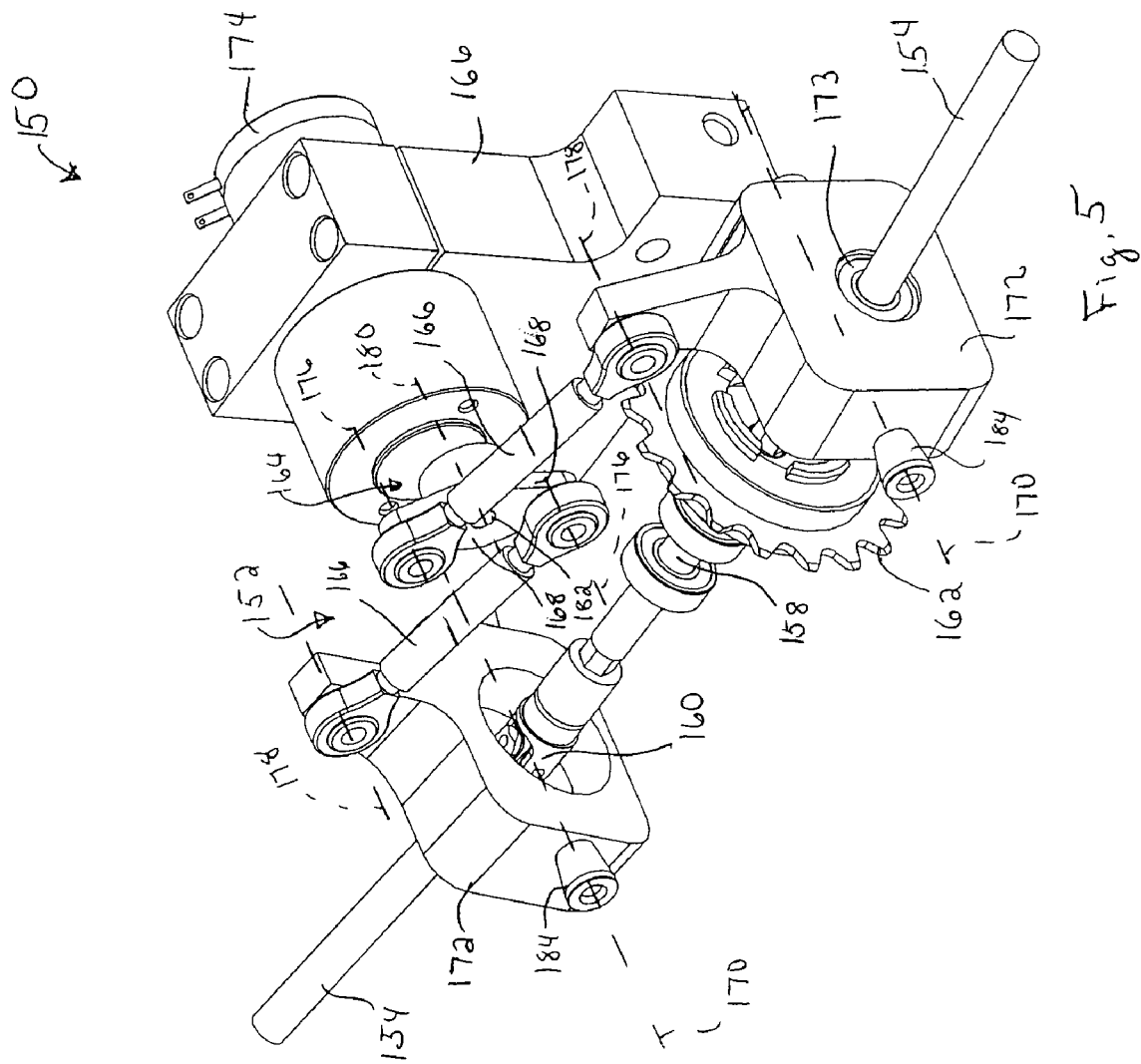
FIG. 5 is an upper right, rear perspective view of one embodiment of a retrofit swinging hub for adjusting wheel camber, with a portion of a mounting plate or hub body removed for clarity, and with the wheel axles pivoted upwardly to tilt the wheels inwardly.
Figure 6:
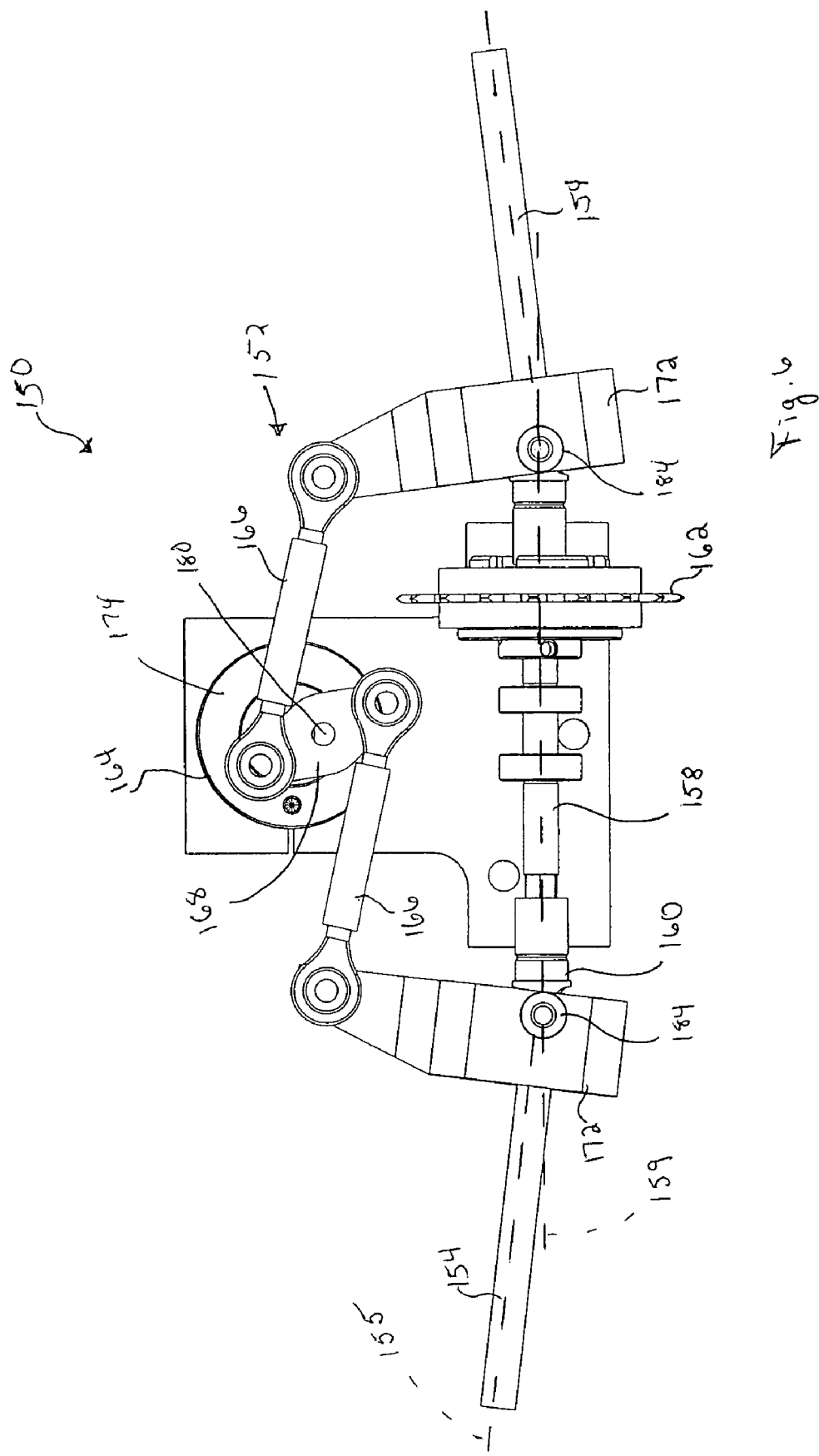
FIG. 6 is a rear view of the swinging hub of FIG. 5, in the same mode of operation and with a portion of a mounting plate or hub body removed for clarity.
Figure 7:
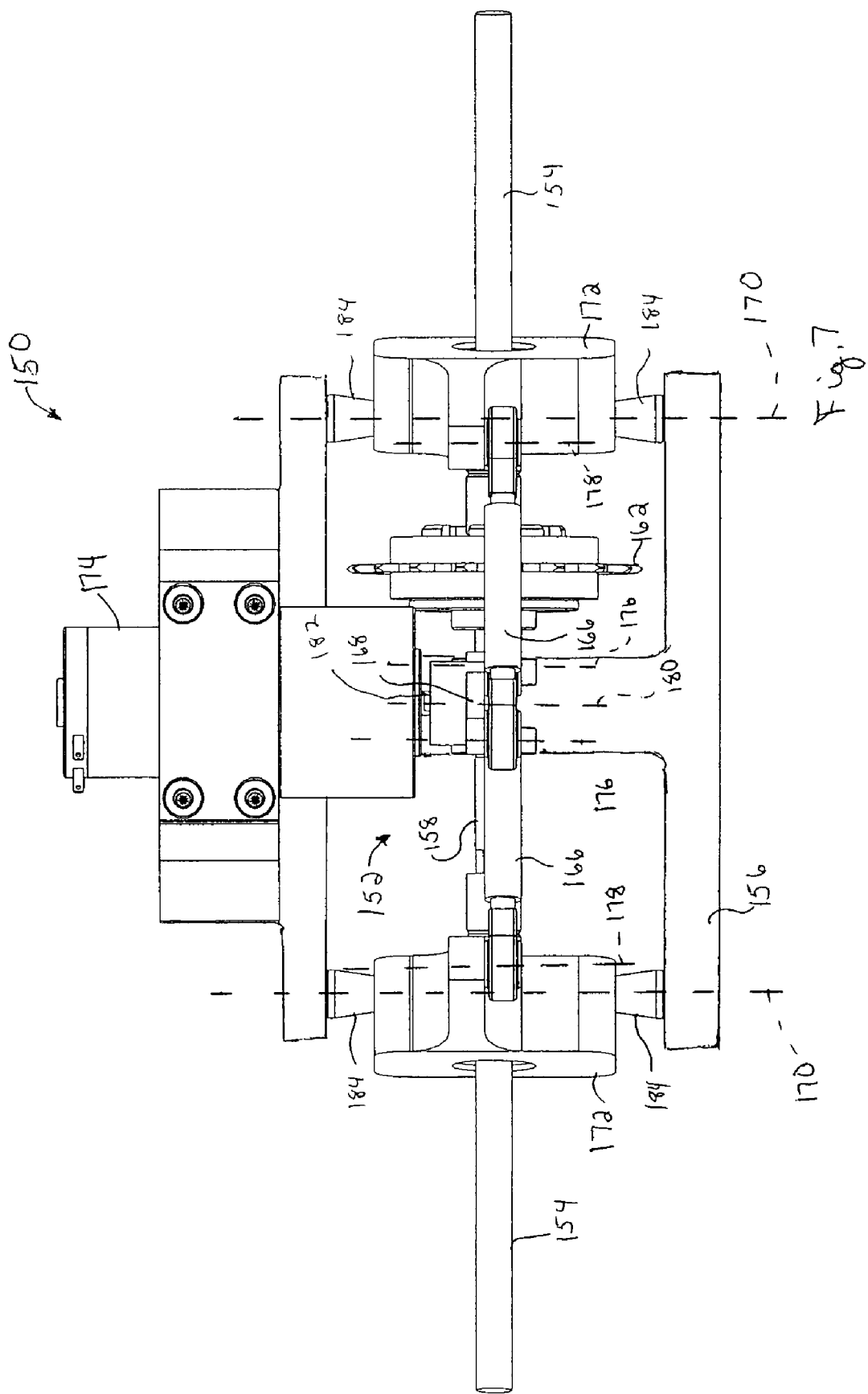
FIG. 7 is a top view of the swinging hub of FIG. 5, in the same mode of operation.

As with the embodiment of FIGS. 1-4, the control mechanism of FIGS. 5-7 limits the axles to vertical pivoting, and provides a range of axle angles including angles above and below horizontal, corresponding to inward and outward wheel tilt, respectively.

Figure 8:
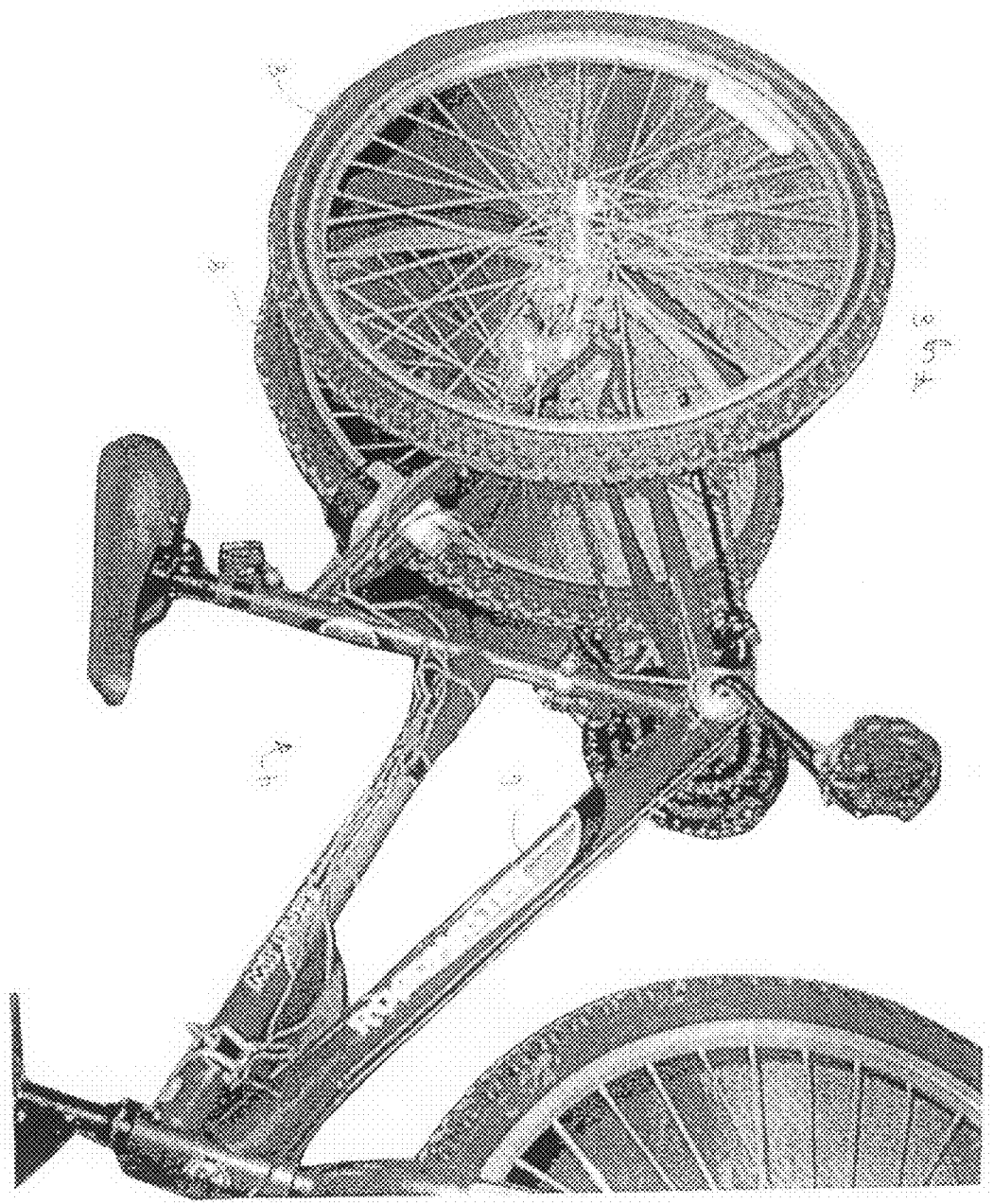
FIG. 8 is a left side perspective view of a bicycle with the swinging hub of FIG. 5 mounted thereon.

FIG. 8 shows the swinging hub attached to the rear dropouts of a bicycle frame and shows a motor control circuit mounted on the seat stays. The circuit is coupled by wiring on the frame to a control switch mounted on the top tube in proximity to the handlebar and adapted to control the motor so as to shift from positive to negative wheel camber or vice versa. Control in response to a speed input from a conventional bicycle computer is also contemplated, whereby the bicycle may have a tricycle mode of operation as a default and switch automatically to a bicycle mode of operation with minimal ground-level spacing between the rear wheels 8 at a predetermined speed.

Figure 9:
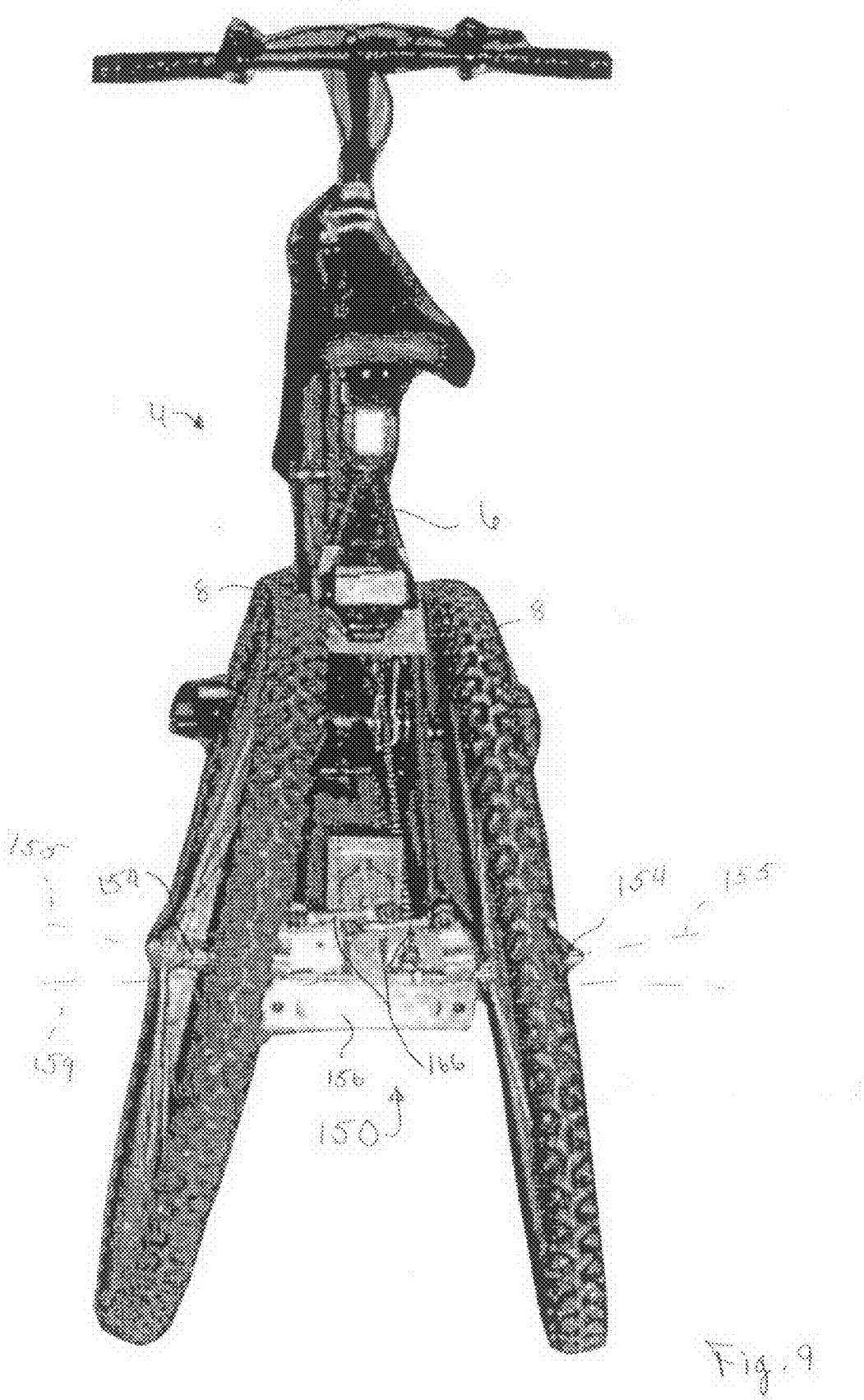

FIGS. 9 and 10 are comparison rear views of the same bicycle 4, with the rear wheels 8 tilted inwardly (negative camber) in FIG. 9 and outwardly (positive camber) in FIG. 10, and FIG. 11 is a close-up view of the same swinging hub with the wheel axles 154 pivoted upwardly and the rear wheels 8 correspondingly tilted inwardly.

Unlike traditional training wheels, which simply prevent a bike from tipping over, a tricycle with a swinging hub 10, 150 allows children to learn how to balance on their own. The variable-camber wheels help balance the bike at rest and at low speeds by virtue of being spread apart at ground level, i.e., a tricycle mode of operation. The tricycle provides more balance at lower speeds when stability is most critical (starting and stopping), by providing a larger stance, and allows the rider to transition into the bicycle mode of operation while in motion.

The tricycle was primarily designed to benefit two categories of users. First, it provides a less challenging and less threatening design solution. The design solution also takes away the fear in learning how to ride a bike. The child feels more self-confident and is more self-reliant during the learning process, which increases the enjoyment of the experience. The tricycle is also easy to use and can be used without having to go through special training or instruction. Secondly, the tricycle also benefits parents in many ways. Parents feel more secure about their children learning how to ride a bike, since it lessens the chance that injury will occur. Parents also do not risk losing the trust of their children as might occur if a crash occurs after a parent pushes a child off. The child is also safer due to the unexposed drive train and easy-to-use operation, which allows the parent to let the child learn on his own, and not have to constantly monitor his safety. The parents also benefit from the tricycle's ease of maintenance and easy replacement of parts.

Utilization of the disclosed swinging hubs for adjusting wheel camber is not limited to the training years such as traditional training wheels. The hubs can be used well into the adolescent and even senior years. A tricycle incorporating a swinging hub for adjusting wheel camber also makes learning how to ride a bicycle fun, which, along with the added enjoyment of using the tricycle beyond the learning years, should encourage the child to use a bicycle in the future. This future use as both recreation and transportation is environmentally sound and helps promote environmental responsibility.

While the swinging hub for adjusting wheel camber has been illustrated and described in detail in the drawings and foregoing description, the same is to be considered as illustrative and not restrictive in character, it being understood that only preferred embodiments have been shown and described and that all changes and modifications that come within the spirit of the invention are desired to be protected. For example, the swinging hub for adjusting wheel camber may be embodied in a tandem and/or recumbent tricycle or bicycle. Engine power such as on a motorcycle, moped or motorized bicycle is also contemplated as an alternative to human power, or in addition thereto, for certain applications. In addition, the principles of the swinging hubs for adjusting wheel camber may also be useful in certain applications with vehicles having more than three wheels, such as four-wheel bicycle-like surreys or carriages modified to incorporate swinging hubs for adjusting wheel camber such that the camber of both front and rear wheelsets is adjustable in the same direction to effectively obtain two-wheel operation.

Fork mounting of a hub and wheelset is also contemplated as indicated above, as is application of the swinging hubs for adjusting wheel camber to mountain bikes and other vehicles having front and/or rear shock absorbers or suspensions, suspension seat posts, conventional spoked wheels, wheel fenders, and upright and drop handlebars with a substantial rearward curve.

We claim:

1. A hub for providing adjustable wheel camber on a human powerable wheeled vehicle convertible between a bicycle mode and a tricycle mode of operation while in motion, comprising:
   a hub body;
   left and right axles extending laterally from said hub body, said axles each adapted to support a wheel, at least one of said axles mounted so as to pivot vertically; and
   a camber control mechanism coupled to said at least one axle and adapted to adjust the angle thereof with respect to the other axle, said camber control mechanism including a linkage for engaging said at least one axle and further including an actuator mounted on said hub body for selectively driving said linkage up and down to adjust the wheel camber between a bicycle mode configuration wherein wheels supported on each of said axles are adjacent each other with no other wheel disposed therebetween at a ground contact point and a tricycle mode configuration wherein wheels supported on each of said axles are substantially displaced from each other at a ground contact point.

2. The hub of claim 1, wherein said actuator is controlled by an electric motor.

3. The hub of claim 2, wherein said actuator is a linear actuator.

4. The hub of claim 2, wherein said actuator is a rotary actuator.

5. The hub of claim 4, wherein said camber control mechanism is a dual control mechanism coupled to both of said axles and adapted to provide coordinated camber adjustment in the same direction for wheels on both axles.

6. The hub of claim 5, wherein said camber control mechanism includes left and right collars around said left and right axles, respectively.

7. A human powerable wheeled vehicle convertible between a bicycle mode and a tricycle mode of operation while in motion with a camber adjustment mechanism, comprising:
   a frame;
   at least one wheel rotatably mounted on one end portion of said frame;
   a hub mounted on a second end portion of said frame, said hub having first and second axles extending laterally therefrom, at least one of said axles being vertically pivotally mounted;
   a wheel mounted on each of said axles; and
   a camber control mechanism for adjusting the angle of said pivotally mounted axle and thereby adjusting the camber of the wheel mounted thereon, said camber control mechanism including a linkage for engaging said pivotally mounted axle and further including an actuator mounted on said hub body for selectively driving said linkage up and down to adjust the wheel camber between a bicycle mode configuration wherein wheels supported on each of said axles are adjacent each other with no other wheel disposed therebetween at a ground contact point and a tricycle mode configuration wherein wheels supported on each of said axles are substantially displaced from each other at a ground contact point.

8. The wheeled vehicle of claim 7, wherein said camber control mechanism includes a collar through which one of said first and second axles extend.

9. The wheeled vehicle of claim 7, further comprising a main axle having an axis relative to which an axis of said first or second axle is pivoted via said camber control mechanism.

10. The wheeled vehicle of claim 7, wherein said camber control mechanism is configured to permit adjustment of wheel camber while the wheeled vehicle is in motion.

11. The wheeled vehicle of claim 7, wherein said camber control mechanism includes a motor configured to drive the actuator.

12. The wheeled vehicle of claim 7, wherein said camber control mechanism is coupled to both of said axles and adapted to provide coordinated camber adjustment in the same negative direction or in the same positive direction for wheels on both axles.

13. A hub for providing adjustable wheel camber on a bicycle, comprising:
   a hub body;
   left and right axles extending laterally from said hub body, said axles each adapted to support a wheel, at least one of said axles mounted so as to pivot vertically; and
   a camber control mechanism coupled to said at least one axle and adapted to adjust the angle thereof with respect to the other axle,
   wherein said hub is adapted for removable attachment to a pair of dropouts on a bicycle frame and wherein said camber control mechanism is configured to permit adjustment of wheel camber while a vehicle to which the hub is mounted is in motion.

14. The hub of claim 13, wherein said camber control mechanism includes an actuator controlled by an electric motor.

15. The hub of claim 14, wherein said actuator is a linear actuator.

16. The hub of claim 14, wherein said actuator is a rotary actuator.

17. The hub of claim 16, wherein said camber control mechanism is a dual control mechanism coupled to both of said axles and adapted to provide coordinated camber adjustment in the same direction for wheels on both axles.

18. The hub of claim 13, wherein said camber control mechanism includes left and right collars around said left and right axles, respectively.

* * * * *